(12) United States Patent
Fan et al.

(10) Patent No.: US 8,806,523 B2
(45) Date of Patent: Aug. 12, 2014

(54) SYSTEM AND METHOD TO ENABLE ACCESS TO BROADBAND SERVICES

(71) Applicant: AT&T Intellectual Property I, L.P., Atlanta, GA (US)

(72) Inventors: James Fan, San Ramon, CA (US); Richard T. Kuo, Mountain View, CA (US); David FengLin Chen, Fremont, CA (US)

(73) Assignee: AT&T Intellectual Properties I, L.P., Atlanta, GA (US)

( * ) Notice: Subject to any disclaimer, the term of this patent is extended or adjusted under 35 U.S.C. 154(b) by 1 day.

(21) Appl. No.: 13/657,473

(22) Filed: Oct. 22, 2012

(65) Prior Publication Data

US 2013/0081076 A1     Mar. 28, 2013

Related U.S. Application Data

(63) Continuation of application No. 12/264,952, filed on Nov. 5, 2008, now Pat. No. 8,321,904.

(51) Int. Cl.
*H04N 7/16* (2011.01)

(52) U.S. Cl.
USPC .............................................. 725/25; 725/34

(58) Field of Classification Search
USPC ............................ 725/25, 34, 59, 93–95, 116
See application file for complete search history.

(56) References Cited

U.S. PATENT DOCUMENTS

| 6,771,953 | B1 | 8/2004 | Chow et al. |
| 6,816,726 | B2 | 11/2004 | Lysejko et al. |
| 6,963,579 | B2 | 11/2005 | Suri |
| 7,010,002 | B2 | 3/2006 | Chow et al. |
| 7,930,711 | B2 | 4/2011 | Pelkey et al. |
| 8,087,047 | B2 | 12/2011 | Olague et al. |
| 2003/0108176 | A1 | 6/2003 | Kung et al. |
| 2004/0249927 | A1* | 12/2004 | Pezutti .......................... 709/223 |
| 2005/0239445 | A1 | 10/2005 | Karaoguz et al. |
| 2006/0259927 | A1 | 11/2006 | Acharya et al. |
| 2007/0253406 | A1 | 11/2007 | Menasco, Jr. et al. |
| 2007/0300252 | A1* | 12/2007 | Acharya et al. ................. 725/25 |
| 2010/0115540 | A1 | 5/2010 | Fan et al. |

OTHER PUBLICATIONS

Non-Final Office Action for U.S. Appl. No. 12/264,952 received from the United States Patent and Trademark Office (USPTO) mailed Nov. 15, 2011, 16 pages.
Final Office Action for U.S. Appl. No. 12/264,952 received from the United States Patent and Trademark Office (USPTO) mailed Apr. 25, 2012, 14 pages.
Notice of Allowance for U.S. Appl. No. 12/264,952 received from the United States Patent and Trademark Office (USPTO) mailed Jul. 30, 2012, 9 pages.

* cited by examiner

*Primary Examiner* — Hunter B Lonsberry
(74) *Attorney, Agent, or Firm* — Toler Law Group, PC

(57) ABSTRACT

A method includes receiving a request at a provisioning system to enable a set-top box device to function at a temporary location. The method includes authenticating the request at the provisioning system. The method includes identifying, at the provisioning system, a broadband service associated with the set-top box device that is available at the temporary location when the request is authenticated. The method also includes sending a configuration message from the provisioning system to the set-top box device to enable the set-top box device to configure the set-top box to receive the broadband service.

20 Claims, 6 Drawing Sheets

SYSTEM AND METHOD TO ENABLE ACCESS TO BROADBAND SERVICES

PRIORITY CLAIM

This application is a continuation of, and claims priority to, U.S. patent application Ser. No. 12/264,952, filed on Nov. 5, 2008, which is hereby incorporated by reference in its entirety.

FIELD OF THE DISCLOSURE

The present disclosure is generally related to enabling access to broadband services.

BACKGROUND

When a subscriber having access to broadband services at a first network location visits a friend or relative at a second network location, the subscriber may not be able to access one or more of the broadband services at the second network location. For example, the subscriber may be unable to view the subscriber's favorite shows when those shows are broadcast on a premium channel that the friend or relative does not subscribe to. Also, the subscriber may be unable to access a high-speed internet connection because the friend or relative does not subscribe to a high-speed internet service.

DETAILED DESCRIPTION

Figure 1:
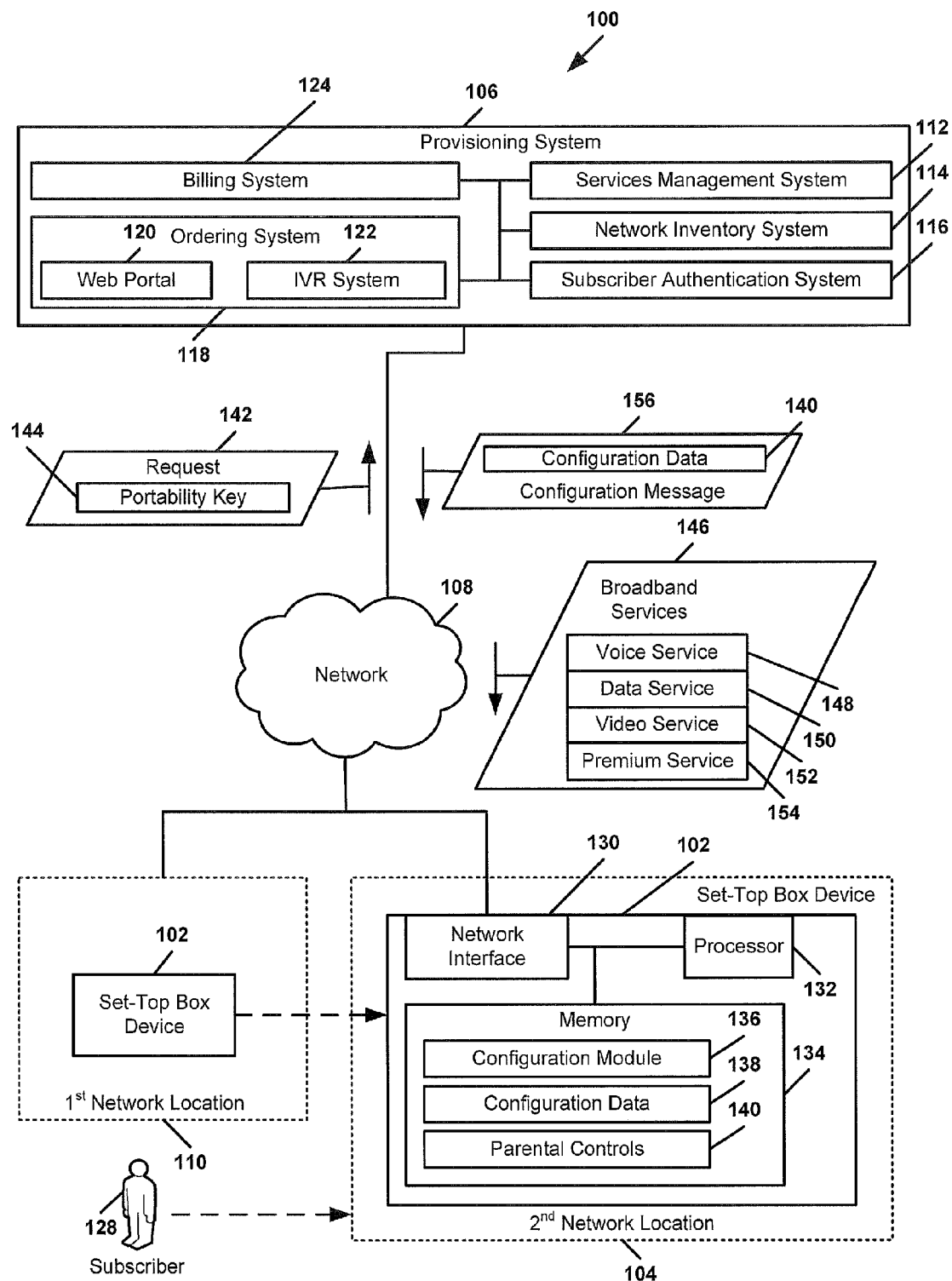
FIG. 1 is a block diagram of a first particular embodiment of a system to enable access to broadband services.

In a particular embodiment, a provisioning system includes a services management system operable to enable a set-top box device that is configured to receive broadband services at a first network location to access one or more of the broadband services at a second network location. The first network location is associated with a subscriber account and the second network location is not associated with the subscriber account. The one or more broadband services include a voice service, a data service, and a video service. The provisioning system includes a subscriber authentication system operable to evaluate a request that includes subscriber authorization data and to selectively authorize access to the one or more broadband services at the second network location based on the subscriber authorization data. The subscriber authentication system is further operable to enable the set-top box device to access the one or more broadband services when the set-top box device is at the second network location after authorizing access to the one or more broadband services at the second network location.

In another particular embodiment, a set-top box device includes a network interface operable to access one or more broadband services via a network when the set-top box device is at a first network location associated with a subscriber. The broadband services including a voice service, a data service, and a video service. The set-top box device also includes a configuration module responsive to the network interface and operable to configure the set-top box device to enable the set box device to access one or more of the broadband services when the set-top box device is at a second network location in response to receiving a configuration message at the network interface.

In another particular embodiment, a computer-readable storage medium includes operational instructions, that when executed by a processor, cause the processor to receive a request to receive broadband services at a second network location via a set-top box device associated with a second subscriber. The request is received on behalf of a first subscriber. The computer-readable storage medium includes operational instructions, that when executed by the processor, cause the processor to determine that the first subscriber has a first subscription enabling the first subscriber to receive the broadband services at a first network location that is different than the second network location. The computer-readable storage medium includes operational instructions, that when executed by the processor, cause the processor to determine that the set-top box device is capable of accessing one or more of the broadband services at the second network location. The computer-readable storage medium includes operational instructions, that when executed by the processor, cause the processor to send a configuration message to the set-top box device to enable access to the one or more broadband services at the second network location.

In another particular embodiment, a method includes receiving a configuration message at a set-top box device. The set-top box device is configured to access a subset of broadband services at a second network location associated with a second subscriber. The method includes temporarily configuring the set-top box to access at least one broadband service not in the subset of broadband services in response to receiving the configuration message. The at least one broadband service is associated with a subscription of a first subscriber associated with a first network location. The method also includes accessing the at least one broadband service at the set-top box device.

FIG. 1 is a block diagram of a first particular embodiment of a system 100 to enable access to broadband services. The system 100 includes a set-top box device 102 at a second network location 104 coupled to a provisioning system 106 via a network 108. The set-top box device 102 is initially configured to receive broadband services 146 at a first network location 110. FIG. 1 illustrates how a first subscriber 128 may physically move the set-top box device 102 from the first network location 110 to the second network location 104 and send a request 142 to the provisioning system 106 to enable the set-top box 102 to receive one or more of the broadband services 146 at the second network location 104. The first network location 110 is associated with the first subscriber 128 and the second network location 104 is not associated with the first subscriber 128. For example, the first network location 110 may include a first internet protocol (IP) address and the second network location 104 may include a second IP address that is different than the first IP address.

The broadband services 146 may include a voice service 148, a data service 150, a video service 152, a premium service 154, other subscription-based service, or any combination thereof. For example, the voice service 148 may include unlimited local and long distance calls within the United States. The data service 150 may include high-speed Internet access. The video service 152 may include access to video content, including movies and television/cable programming. The premium service 154 may include video-on-demand, pay-per-view, and premium video channels.

The set-top box device 102 includes a network interface 130, a processor 132 and a memory 134. The memory 134 includes a configuration module 136, configuration data 138, and parental controls 140. The network interface 130 is operable to access the broadband services 146 via the network 108 when the set-top box device 102 is at the first network location 110 associated with the first subscriber 128. In response to receiving a configuration message 156 at the network interface 130, the configuration module 136 is operable to configure the set-top box device 102 to access one or more of the broadband services 146 when the set-top box device 102 is at the second network location 104. The configuration module 136 is further operable to configure the set-top box device 102 based at least partially on one or more of the parental controls 140.

In the embodiment shown, the provisioning system 106 includes a services management system 112, a network inventory system 114, a subscriber authentication system 116, an ordering system 118, and a billing system 124. The ordering system 118 includes a web portal 120 and an interactive voice response (IVR) system 122. The ordering system 118 is operable to receive an order that includes the request 142 to enable access to the one or more broadband services 146 at the set-top box device 102 at the second network location 104.

The services management system 112 is operable to enable the set-top box device 102 that is configured to receive the broadband services 146 at the first network location 110 to access one or more of the broadband services 146 at the second network location 104. In a particular embodiment, the services management system 112 instructs the subscriber authentication system 116 to send the configuration message 156 to the set-top box device 102 to enable the set-top box device 102 to access one or more of the broadband services 146 at the second network location 104. The subscriber authentication system 116 is operable to authenticate the request 142 that includes subscriber authorization data, such as a portability key 144, authorizing access to one or more of the broadband services 146 at the second network location 104.

The network inventory system 114 is operable to determine that the network 108 is capable of providing the requested one or more broadband services 146 at the second network location 104. For example, the network inventory system 114 is operable to determine that the data service 150 can be provided at the second network location 104 based at least partially on a distance of the second network location 104 to a network delivery node (not shown). To illustrate, when the request 142 includes a request to enable the data service 150, such as a digital subscriber loop (DSL) service, at the second network location 104, the network inventory system 114 determines whether the second network location 104 is close enough to a central office (not shown) to allow the DSL service to be provided at the second network location 104.

The billing system 124 is operable to charge a fee to an account associated with the first subscriber 128. The fee is associated with enabling access to one or more of the broadband services 146 at the second network location 104. In a particular embodiment, the first network location 110 may be a first residence and the second network location 104 may be a second residence. The first network location 110 may be located in a particular city and the second network location 110 may be in the same city or in a different city.

The portability key 144 may be used to permit the first subscriber 128 to enable the set-top box device 102 to access one or more of the broadband services 146 at the second network location 104. In a particular embodiment, the subscriber authentication system 116 authenticates the portability key 144 prior to sending the configuration message 156 to the set-top box device 102. The configuration message 156 may include an authorization to the set-top box device 102 to access one or more of the broadband services 146 at the second network location 104, a decoding key to enable the set-top box device 102 to decode the video service 152 or the premium service 154, an internet protocol (IP) address of a service delivery node (not shown) of the network 108, other data related to enabling access to one or more of the broadband services 146 at the second network location 104, or any combination thereof.

The subscriber authentication system 116 is further operable to enable the set-top box device 102 to access one or more of the broadband services 146 at the second network location 104 within a predetermined time period after the ordering system 118 receives the request 142. For example, the set-top box device 102 may be enabled to access one or more of the broadband services 146 at the second network location 104 within fifteen minutes after the ordering system 118 receives the request 142. The configuration module 136 is operable to configure the set-top box device 102 to enable access to one or more of the broadband services 146 at the second network location 104 based at least partially on the parental controls 140.

In operation, the first subscriber 128 moves the set-top box device 102 from the first network location 110 to the second network location 104. For example, the first subscriber 128 may visit a friend or relative at the second network location 104. The first subscriber 128 uses the ordering system 118 to send the request 142 including the portability key 144 to the provisioning system 106. For example, the first subscriber 128 may use the web portal 120 or the IVR system 122 to send the request 142.

The services management system 112 receives the request 142 from the ordering system 118 and instructs the subscriber authentication system 116 to authenticate the request 142. After the subscriber authentication system 116 authenticates the request 142 using the portability key 144, the services management system 112 instructs the network inventory system 114 to determine which of the requested broadband services 146 may be accessed by the set-top box device 102 at the second network location 104. Based on the determination of the network inventory system 114, the services management system 112 instructs the subscriber authentication system 116 to send the configuration message 156, including configuration data 140, to the set-top box device 102 at the second network location 104.

The set-top box device 102 receives the configuration message 156, including the configuration data 140, at the second network location 104. The configuration module 136 uses the configuration data 140 to configure the set-top box device 102 to enable the set-top box device 102 to access one or more of the broadband services 146 at the second network location 104. The billing system 124 charges a fee to an account associated with the first subscriber 128 for enabling the set-top box device 102 to access one or more of the broadband services 146 at the second network location 104.

By sending the request 142, the first subscriber 128 can visit a friend or relative and receive one or more of the broadband services 146 at the second network location 104 for a temporary period of time. For example, when the first subscriber 128 wishes to view a particular show of the premium service 154, the first subscriber 128 may view the premium service 154 at the second network location 104 by moving the set-top box device 102 to the second network location 104 and sending the request 142 to the provisioning system 106. In the request 142, the first subscriber 128 may specify which of the broadband services 146 that the first subscriber 128 wishes to receive at the second network location 104. For example, the first subscriber 128 may wish to receive only high-speed Internet services, i.e. the data service 150, at the second network location 104. As another example, the first subscriber 128 may wish to receive the premium service 154 at the second network location 104. Further, by moving the set-top box device 102 to the second network location 104 and sending the request 142, the first subscriber 128 can demonstrate one or more of the broadband services 146 to the friend or relative associated with the second network location 104.

Figure 2:
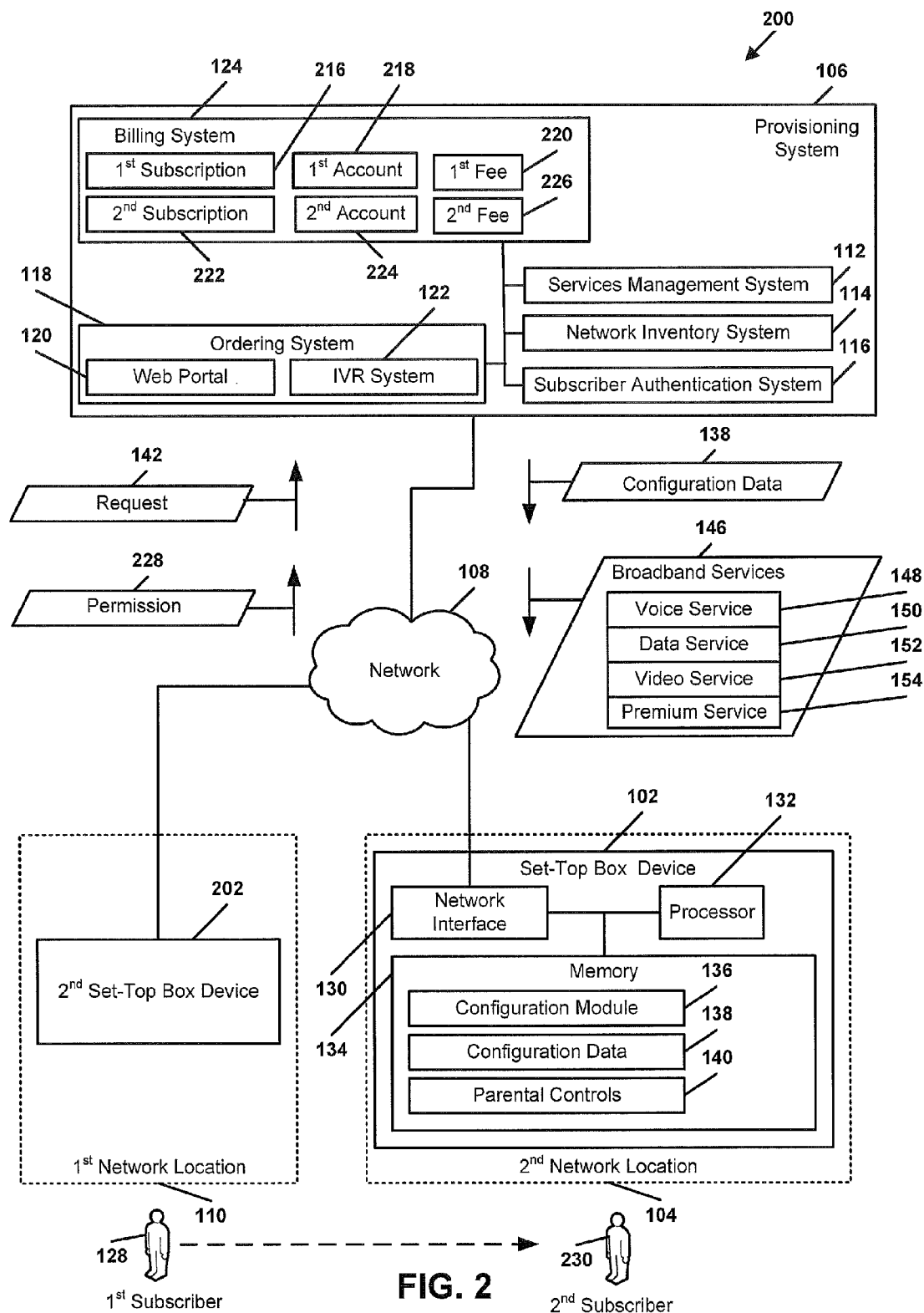
FIG. 2 is a block diagram of a second particular embodiment of a system to enable access to broadband services.

FIG. 2 is a block diagram of a second particular embodiment of a system 200 to enable access to broadband services. The system 200 includes the set-top box device 102 located at the second network location 104 and a second set-top box device 202 located at the first network location 110. The set-top box device 102 and the second set-top box device 202 are coupled to the provisioning system 106 via the network 108. The set-top box device 102 and the second set-top box device 202 are enabled to receive at least one of the broadband services 146 via the network 108. FIG. 2 illustrates how the first subscriber 128 may visit a second subscriber 230 and enable the set-top box device 102 to access one or more of the broadband services 146 at the second network location 104.

The set-top box device 102 includes the network interface 130, the processor 132, and the memory 134. The memory 134 includes the configuration module 136, the configuration data 138, and the parental controls 140. The provisioning system 106 includes the billing system 124, the ordering system 118, the network inventory system 114, and the subscriber authentication system 116.

The provisioning system 106 is operable to receive the request 142 on behalf of the first subscriber 128 to receive one or more of the broadband services 146 at the second network location 104 via the set-top box device 102 associated with the second subscriber 230. The provisioning system 106 is operable to receive the request 142 via the ordering system 118. The provisioning system 106 is further operable to receive a permission 228 from the second subscriber 230 granting permission to enable access to at least one of the broadband services 146 at the set-top box device 102.

The subscriber authentication system 116 is operable to authenticate the permission 228 of the second subscriber 230 before enabling access to one or more of the broadband services 146 at the set-top box device 102. The subscriber authentication system 116 is further operable to determine that the first subscriber 128 has a first subscription 216 enabling the first subscriber 128 to receive one or more of the broadband services 146 at the first network location 110. In a particular embodiment, the second subscriber 230 has a second subscription 222, and the first subscription 216 enables access to at least one of the broadband services 146 that is not available with the second subscription 222. The network inventory system 114 is operable to determine that the set-top box device 102 is capable of accessing one or more of the broadband services 146 at the second network location 104. The subscriber authentication system 116 is further operable to send the configuration data 138 in a configuration message, such as the configuration message 156 of FIG. 1, to the set-top box device 102 to enable access to one or more of the broadband services 146 at the second network location 104.

The set-top box device 102 is operable to receive the configuration data 138 and to store the configuration data 138 at the memory 134. In a particular embodiment, the configuration module 136 is operable to determine the parental controls 140 associated with the second subscriber 230 before conditionally enabling access to one or more of the broadband services 146 at the set-top box device 102 based on the parental controls 140.

The subscriber authentication system 116 is further operable to disable one or more of the broadband services 146 at the second set-top box device 202 at the first network location 110 after enabling access to one or more of the broadband services 146 at the set-top box device 102 at the second network location 104. The subscriber authentication system 116 is further operable to re-enable access to one or more of the broadband services 146 at the second set-top box device 202 at the first network location 110 and to disable access to one or more of the broadband services 146 at the set-top box device 102 at the second network location 104 after a predetermined period of time.

In operation, the first subscriber 128 moves from the first network location 110 to the second network location 104. For example, the first subscriber may visit a friend or relative at the second network location 104. The second subscriber 230 subscribes to and receives at least one but not all of the broadband services 146 at the second set-top box device 202. When visiting the second subscriber 230, the first subscriber 128 may wish to receive at least one of the broadband services 146 not currently available at the second network location 104. To receive at least one of the broadband services 146 at the second network location 104, the first subscriber 128 sends the request 142 to the provisioning system 106 and the second subscriber 230 sends the permission 228 to the provisioning system 106. The request 142 and the permission 228 may be sent via the web portal 120 or via the IVR system 122 of the ordering system 118.

The services management system 112 receives the request 142 of the first subscriber 128 and receives the permission 228 of the second subscriber 230 from the ordering system 118. The services management system 112 instructs the subscriber authentication system 116 to authenticate the request 142 and authenticate the permission 228. After the request 142 and the permission 228 have been authenticated, the services management system 112 instructs the network inventory system 114 to determine whether the second set-top box device 202 is capable of receiving the requested broadband services 146 at the second network location 104. For example, the network inventory system 114 may determine whether the network 108 has a service delivery node (not shown) that is at a distance from the second network location 104 that enables the network 108 to deliver the requested broadband services 146 at the second network location 104.

After the network inventory system 114 determines that the requested broadband services 146 may be received at the second network location 104, the services management system 112 instructs the subscriber authentication system 116 to send the configuration data 138 to enable the second set-top box device 202 to receive the requested broadband services 146 at the second network location 104. The configuration module 136 receives the configuration data 138 from the provisioning system 106 and configures the second set-top box device 202 to receive the requested broadband services 146 at the second network location 104 based at least partially on the configuration data 138. In a particular embodiment, the configuration module 136 configures the second set-top box device 202 to receive the requested broadband services 146 at the second network location 104 for a temporary period of time. The temporary period of time during which the requested broadband services 146 are available at the second network location 104 may be specified by the first subscriber 128 or the second subscriber 230 and may be limited based on a maximum time specified by a service provider of the requested broadband services 146.

By sending the request 142, the first subscriber 128 is able to receive one or more of the broadband services 146 at the second network location 104 via the second set-top box device 202. For example, when the first subscriber 128 subscribes to the premium service 154 at the first network location 110 and the second subscriber 230 does not subscribe to the premium service 154 at the second network location 104, the first subscriber 128 may wish to temporarily receive the premium service 154 at the second network location 104 while the first subscriber 128 is at the second network location 104. The first subscriber 128 may send the request 142 to the provisioning system 106 to enable the second set-top box device 202 to receive the premium service 154 at the second network location while the first subscriber 128 is visiting the second network location 104. Thus, the first subscriber 128 is able to receive one or more of the broadband services 146 at the second network location 104 that are not subscribed to by the second subscriber 230.

The billing system 124 includes a first subscription 216 and a first account 218 associated with the first subscriber 128. The billing system 124 also includes a second subscription 222 and a second account 224 associated with the second subscriber 230. The subscriber authentication system 116 is further operable to instruct the billing system 124 to bill a second fee 226 to a second account 224 associated with the second subscriber 230. In FIG. 2, several scenarios are possible to determine how to bill the first account 218 and the second account 224.

In a first scenario, the first subscriber 128 and a family of the first subscriber 128 are located at the first network location 110. The set-top box device 102 accesses one or more of the broadband services 146 at the first network location 110. The first subscriber 128 temporarily moves to the second network location 104 to visit a friend or relative. The first subscriber 128 temporarily enables access to one or more of the broadband services 146 via the set-top box device 102 at the second network location 104 while the second set-top box device 102 at the first network location 110 continues to access one or more of the broadband services 146. After a predetermined period of time, during which both of the set-top box devices 102 and 202 have access enabled to one or more of the broadband services 146, access to one or more of the broadband services 146 is disabled at the second network location 104. For example, the first subscriber 128 may enable access to one or more of the broadband services 146 at the second network location 102 for a two week period during which the first subscriber is at the second network location 104. When the first subscriber 128 moves back to the first network location 110 after two weeks, access to one or more of the broadband services 146 is disabled at the second network location 104. In a particular embodiment, the request 142 includes the time period during which access to one or more of the broadband services 146 are enabled at the second network location 104.

In a particular embodiment, the first account 218 of the first subscriber 128 is charged a first fee 220 for enabling access to one or more of the broadband services 146 simultaneously at both the first network location 110 and at the second network location 104. In another particular embodiment, the first account 218 is charged the first fee 220 for allowing the set-top box device 102 to access the broadband services 146 at the first network location 110, and the second account 234 is charged a second fee 226 for allowing the second set-top box device 202 to access one or more of the broadband services 146 at the second network location 104.

In a second scenario, the first subscriber 128 and the family of the first subscriber 128 move from the first network location 110 to the second network location 104. When the first subscriber 128 is at the second network location 104, the first subscriber 128 temporarily disables access to the broadband services 146 at the set-top box device 102 and enables access to one or more of the broadband services 146 at the second network location 104. In the second scenario, after a predetermined period of time, the second set-top box device 110 is disabled from accessing one or more of the broadband services 146 and the set-top box device 102 is re-enabled to access one or more of the broadband services 146. In a particular embodiment, first account 218 of the first subscriber 128 is billed the first fee 220 for enabling access to one or more of the broadband services 146 at the second network location 104. In a second particular embodiment, the second account 224 of the second subscriber 230 is billed the second fee 226 for enabling the second set-top box device 202 to access one or more of the broadband services 146 at the second network location 104.

The configuration module 136 is operable to conditionally enable access to one or more of the broadband services 146 at the set-top box device 102 based on the set of parental controls 140 associated with the second subscriber 230. This may be done to prevent a child from enabling access to adult content while visiting a friend. For example, the permission 228 may enable the set-top box device 102 to access the premium service 154 based on the parental controls 140. To illustrate, the permission 228 of the second subscriber 320 may enable the set-top box device 102 to receive only non-adult content of the premium service 154.

Figure 3:
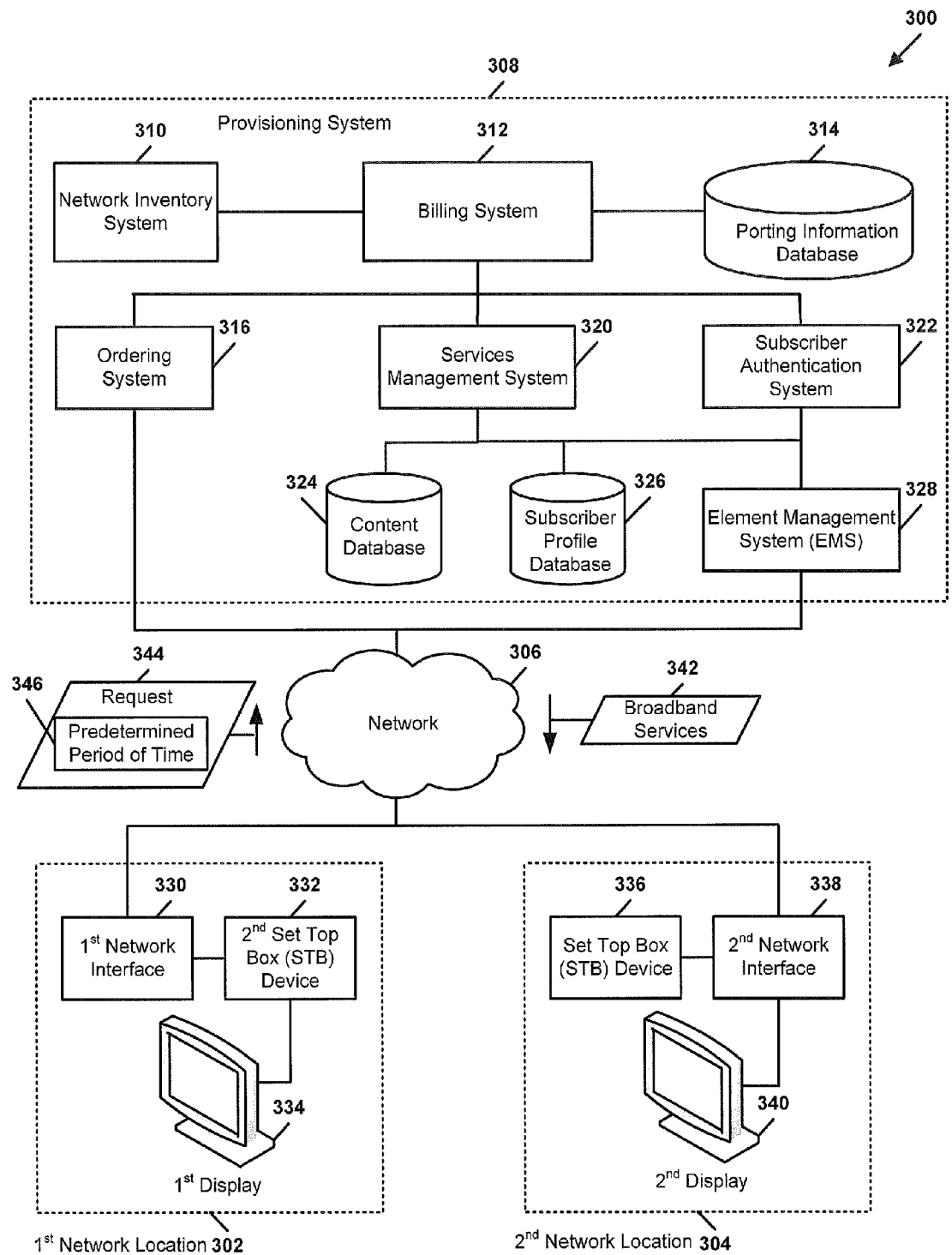
FIG. 3 is a block diagram of a third particular embodiment of a system to enable access to broadband services.

FIG. 3 is a block diagram of a third particular embodiment of a system 300 to enable access to broadband services. The system 300 includes a network 306 coupled to a second set-top box (STB) device 332 via a first network interface 330 at a first network location 302. For example, the first network location 110 may include a first internet protocol (IP) address. The network 306 is also coupled to a set-top box (STB) device 336 via a second network interface 338 at a second network location 304. For example, the second network location 104 may include a second IP address. A first display 334 is coupled to the second set-top box device 332 and a second display 340 is coupled to the set-top box device 336. The network 306 is also coupled to a provisioning system 308. The provisioning system 308 includes a network inventory system 310 and a porting information database 314 coupled to a billing system 312. An ordering system 316, a services management system 320, and a subscriber authentication system 322 are each coupled to the billing system 312. A content database 324, a subscriber profile database 326, and an element management system (EMS) 328 are coupled to the services management system 320 and coupled to the subscriber authentication system 322.

The ordering system 316 is operable to receive a request 344 from a first subscriber to receive one or more broadband services 342 at the second network location 304. The services management system 320 is operable to activate and deliver one or more of the broadband services 342 at the second network location 304. The subscriber authentication system 322 is operable to provide policy management, including authentication of subscriber request 344 and assignment of Internet Protocol (IP) addresses to the set-top box devices 332 and 336. The element management system 328 is operable to manage the elements of the network 306.

In a particular embodiment, the network inventory system 310 is the network inventory system 114 depicted in FIG. 1 and FIG. 2, the billing system 310 is the billing system 124 depicted in FIG. 1 and FIG. 2, the ordering system 316 is the ordering system 118 depicted in FIG. 1 and FIG. 2, the services management system 320 is the services management system 112 depicted in FIG. 1 and FIG. 2, and the subscriber authentication system 322 is the subscriber authentication system 116 depicted in FIG. 1 and FIG. 2. In a particular embodiment, the set-top box device 336 is the set-top box device 102 depicted in FIG. 1 and FIG. 2 and the second set-top box device 332 is the second set-top box device 202 depicted in FIG. 2.

The content database 324 includes multimedia content that is delivered via the network 306 to the second set-top box device 332 and to the set-top box device 336. The services management system 320 is operable to determine that the set-top box devices 332 and 336 are authorized to receive one or more of the broadband services 342 and to enable delivery of one or more of the broadband services 342 to the set-top box devices 332 and 336. The subscriber profile database 326 includes profiles of each subscriber. For example, the subscriber profile database 326 may include information about each subscriber, such as the subscriber's individual subscription and account number.

The network inventory system 310 includes information associated with the network 306 that is used to determine the capability of the network 306 to deliver the broadband services 342 at the first network location 302 and at the second network location 304. For example, when the provisioning system 308 receives a request 344 to provide the broadband services 342 at the second network location 304, the network inventory system 310 determines whether the network 306 includes the appropriate equipment inventory to deliver the requested broadband services 342 at the second network location 304. The ordering system 316 is operable to receive an order from a subscriber to access one or more of the broadband services 342, and the billing system 312 is operable to bill the subscriber for access to the broadband services 342.

The porting information database 314 is operable to store information related to porting services from the first network location 302 to the second network location 304. For example, when a first subscriber associated with the first network location 302 moves to the second network location 304 and enables access to one or more of the broadband services 342 at the second network location 304, the porting information database 314 stores the information associated with porting one or more broadband services 342 to the second network location 304.

In operation, a subscriber sends the request 344 via the ordering system 316 to the provisioning system 308 to enable access to one or more of the broadband services 342 at the second network location 304. The ordering system 316 determines that the request 344 includes an order and sends the contents of the request 344 to the billing system 312. The billing system 312 instructs the network inventory system 310 to check the network inventory to determine whether the requested broadband services 342 may be accessed at the second network location 304. The billing system 312 instructs the subscriber authentication system 322 to authenticate the request 344. The subscriber authentication system 322 accesses the subscriber profile database 326 to authenticate the request 344. For example, the subscriber profile database 326 may include a portability key, a password, or other information associated with a subscriber account to enable the subscriber authentication system 322 to authenticate the request 344.

The billing system 312 stores information associated with porting one or more of the broadband services 342 to the second network location 304 at the porting information database 314. Porting one or more of the broadband services 342 to the second network location 304 refers to enabling access to one or more of the broadband services 342 at the second network location 304. The billing system 312 bills the subscriber for enabling access to one or more of the broadband services 342 at the second network location 304. In a particular embodiment, the billing system 312 may instruct the EMS 328 to reconfigure one or more elements of the network 306 to enable access to the requested broadband services 342 at the second network location 304. The billing system 312 instructs the services management system 320 to activate and deliver the requested broadband services 342 to the second network location 304. In a particular embodiment, after access to the requested broadband services 342 is enabled at the second network location 304 and a predetermined period of time 346 has elapsed, the billing system 312 disables access to one or more of the broadband services 342 at the second network location 304. In another particular embodiment, the billing system 312 re-enables access to the broadband services 342 at the first network location 302 after the predetermined period of time 346 has elapsed.

Figure 4:
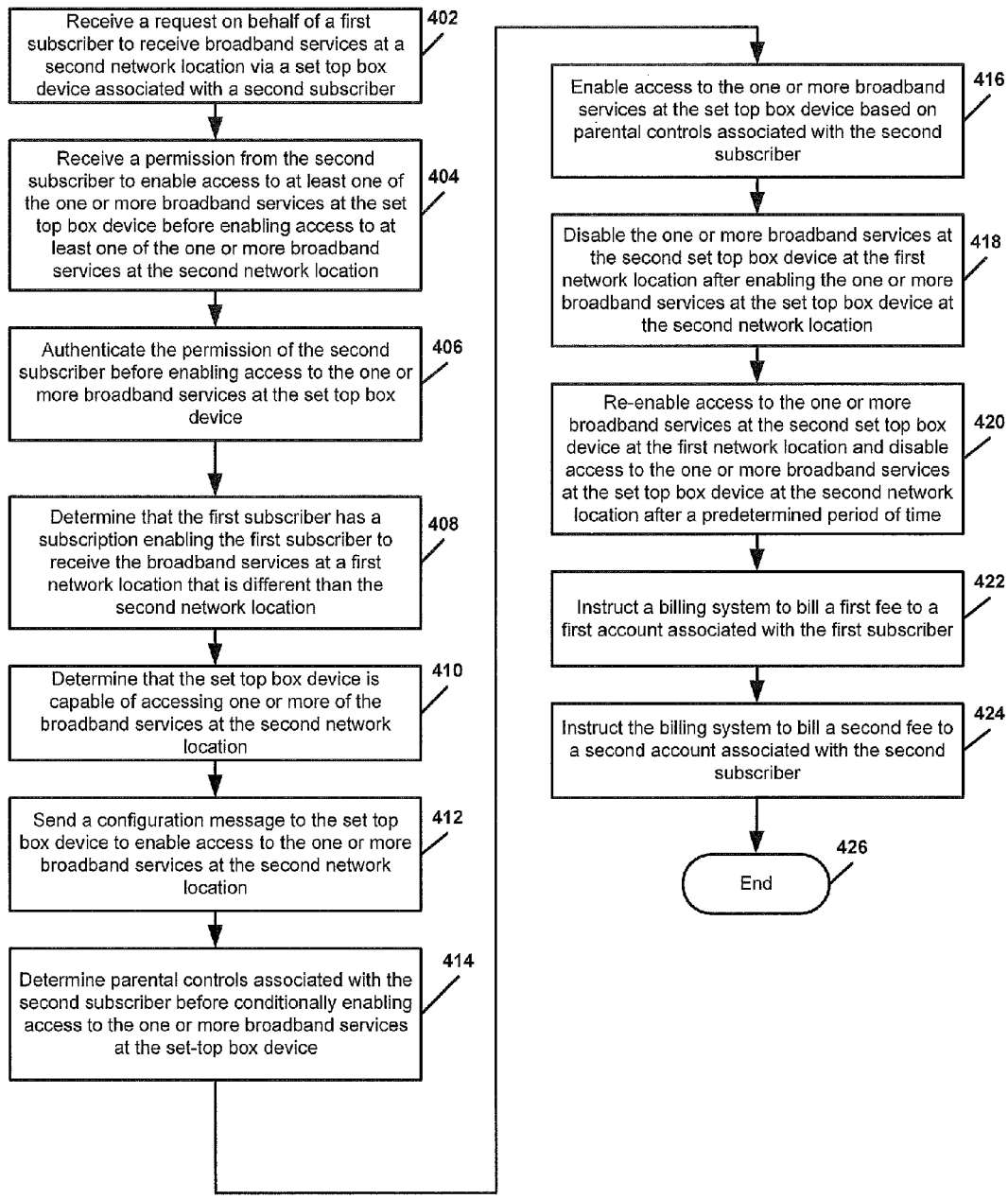
FIG. 4 is a flow diagram of a first particular embodiment of a method of enabling access to broadband services.

FIG. 4 is a flow diagram of a first particular embodiment of a method of enabling access to broadband services. The method may be executed by the subscriber authentication system 116 depicted in FIG. 1 or FIG. 2.

At 402, a request is received on behalf of a first subscriber to receive broadband services at a second network location via a set-top box device associated with a second subscriber. For example, in FIG. 2, the subscriber authentication system 116 receives the request 142 to receive one or more of the broadband services 146 at the set-top box device 102. Moving to 404, permission is received from the second subscriber to enable access to at least one of the one or more broadband services at the set-top box device before enabling access to at least one of the one or more broadband services at the second network location. For example, in FIG. 2, the subscriber authentication system 116 receives the permission 228 of the second subscriber 230 to enable access to one or more broadband services 146 at the set-top box device 102 at the second network location 104. Advancing to 406, the permission of the second subscriber is authenticated before enabling access to the one or more broadband services at the set-top box device. For example, in FIG. 2, the subscriber authentication system 116 authenticates the permission 228 of the second subscriber 230 before enabling access to one or more of the broadband services 146 at the set-top box device 102.

Proceeding to 408, a determination is made that the first subscriber has a subscription enabling the first subscriber to receive one or more of the broadband services at a first network location. For example, in FIG. 2, the subscriber authentication system 116 determines that the first subscription 216 of the first subscriber 128 enables the first subscriber 128 to receive one or more of the broadband services 146 at the first network location 110. Continuing to 410, a determination is made that the set-top box device is capable of accessing one or more of the broadband services at the second network location. For example, in FIG. 2, the network inventory system 114 determines whether the set-top box device 102 is capable of accessing one or more of the broadband services 146 at the second network location 104. Advancing to 412, a configuration message is sent to the set-top box device to enable access to one or more of the broadband services at the second network location. For example, in FIG. 2, the subscriber authentication system 116 sends the configuration data 138 to the set-top box device 102 at the second network location 104.

Moving to 414, parental controls associated with the second subscriber are determined before enabling access to one or more of the broadband services at the set-top box device. For example, in FIG. 2, the configuration module 136 determines the parental controls 140 of the second subscriber 230 before the configuration module 136 enables access to one or more of the broadband services 146 at the set-top box device 102. Proceeding to 416, access to one or more of the broadband services is enabled at the set-top box device based on the parental controls associated with the second subscriber. For example, in FIG. 2, access to one or more of the broadband services 146 is enabled at the set-top box device 102 based on the parental controls 140 associated with the second subscriber 230.

Advancing to 418, one or more of the broadband services are disabled at the second set-top box device at the first network location after enabling access to one or more of the broadband services at the set-top box device at the second network location. For example, in FIG. 2, access to one or more of the broadband services 146 are disabled at the second set-top box device 202 at the first network location 110 after enabling access to one or more of the broadband services 146 at the set-top box device 102 at the second network location 104. Proceeding to 420, access to the one or more of the broadband services is re-enabled at the second set-top box device at the first network location and disabled at the set-top box device at the second network location after a predetermined period of time. For example, in FIG. 2, access to one or more of the broadband services 146 is re-enabled at the second set-top box device 202 at the first network location 110 and disabled at the set-top box device 102 at the second network location 104 after the predetermined period of time.

Advancing to 422, a billing system is instructed to bill a first fee to a first account associated with the first subscriber. For example, in FIG. 2, the billing system 124 is instructed to bill the first fee 220 to the first account 218 associated with the first subscriber 128. Advancing to 424, the billing system is instructed to bill the second fee to a second account associated with the second subscriber. For example, in FIG. 2, the billing system 124 is instructed to bill the second fee 226 to the second account 224 associated with the second subscriber 230. The method ends at 426.

Figure 5:
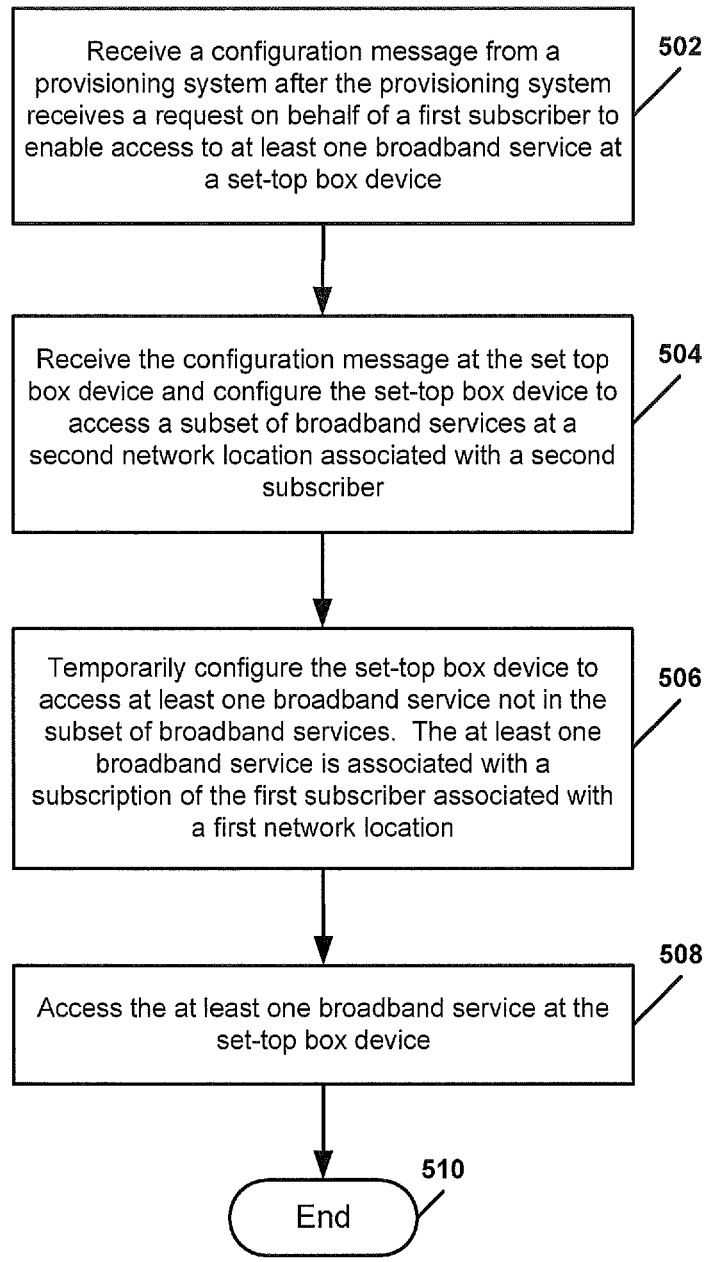
FIG. 5 is a flow diagram of a second particular embodiment of a method of enabling access to broadband services.

FIG. 5 is a flow diagram of a second particular embodiment of a method of enabling access to broadband services at a second network location. The method may be performed by the set-top box device 102 depicted in FIG. 1 or FIG. 2.

At 502, a configuration message is received from a provisioning system after the provisioning system receives a request on behalf of a first subscriber to enable access to at least one broadband service at a set-top box device. For example, in FIG. 1, the set-top box device 102 receives the configuration message 156 from the provisioning system 106 after the provisioning system 106 receives the request 142 on behalf of the first subscriber 128 to enable access to at least one of the broadband services 146 at the set-top box device 102. Continuing to 504, the configuration message is received at the set-top box device, and the set-top box device is configured to access a subset of the broadband services at a second network location associated with a second subscriber. For example, in FIG. 2, the set-top box device 102 receives the configuration data 138 in a configuration message and the configuration module 136 configures the set-top box device 102 to access a subset of the broadband services 146 at the second network location 104.

Moving to 506, the set-top box device is temporarily configured to access at least one broadband service not in the subset of broadband services. The at least one broadband service is associated with a subscription of the first subscriber associated with a first network location. For example, in FIG. 2, the set-top box device 102 is temporarily configured to access at least one of the services 148, 150, 152, and 154 not in the subset of the broadband services 146 that the set-top box device 102 was receiving. The at least one broadband service is associated with the subscription of the first subscriber 128 where the first subscriber 128 is not associated with the set-top box device 102. Continuing to 508, the at least one broadband service is accessed at a second set-top box device. For example, in FIG. 2, at least one of the services 148, 150, 152, and 154 are accessed at the set-top box device 102. The method then ends at 510.

Figure 6:
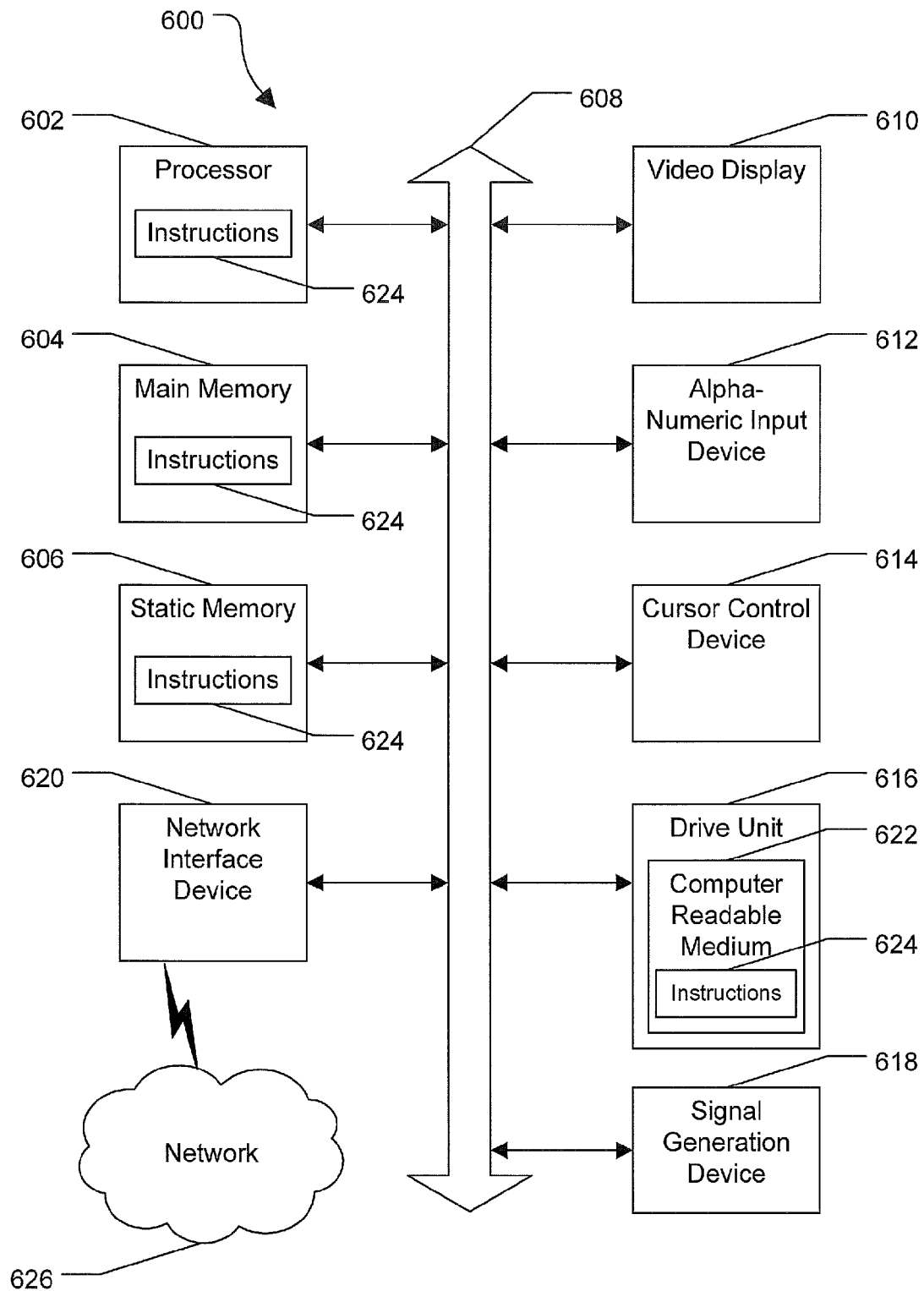
FIG. 6 is a block diagram of an illustrative embodiment of a general computer system.

Referring to FIG. 6, an illustrative embodiment of a general computer system is shown and is designated 600. The computer system 600 can include a set of instructions that can be executed to cause the computer system 600 to perform any one or more of the methods or computer based functions disclosed herein. The computer system 600, or any portion thereof, may operate as a standalone device or may be connected, e.g., using a network, to other computer systems or peripheral devices, including a digital video recorder, or a set-top box device, as shown in FIG. 1-3.

In a networked deployment, the computer system may operate in the capacity of a server, such as a video server or application server, or a set-top box device. The computer system 600 can also be implemented as or incorporated into various devices, such as a personal computer (PC), a tablet PC, a set-top box (STB) device, a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 600 can be implemented using electronic devices that provide voice, video or data communication. Further, while a single computer system 600 is illustrated, the term "system" shall also be taken to include any collection of systems or sub-systems that individually or jointly execute a set, or multiple sets, of instructions to perform one or more computer functions.

As illustrated in FIG. 6, the computer system 600 may include a processor 602, e.g., a central processing unit (CPU), a graphics-processing unit (GPU), or both. Moreover, the computer system 600 can include a main memory 604 and a static memory 606 that can communicate with each other via a bus 608. As shown, the computer system 600 may further include a video display unit 610, such as a liquid crystal display (LCD), an organic light emitting diode (OLED), a flat panel display, a solid-state display, or a cathode ray tube (CRT). Additionally, the computer system 600 may include an input device 612, such as a keyboard, and a cursor control device 614, such as a mouse. The computer system 600 can also include a disk drive unit 616, a signal generation device 618, such as a speaker or remote control, and a network interface device 620.

In a particular embodiment, as depicted in FIG. 6, the disk drive unit 616 may include a computer-readable medium 622 in which one or more sets of instructions 624, e.g. software, can be embedded. Further, the instructions 624 may embody one or more of the methods or logic as described herein. In a particular embodiment, the instructions 624 may reside completely, or at least partially, within the main memory 604, the static memory 606, and/or within the processor 602 during execution by the computer system 600. The main memory 604 and the processor 602 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 624 or receives and executes instructions 624 responsive to a propagated signal, so that a device connected to a network 626 can communicate voice, video or data over the network 626. Further, the instructions 624 may be transmitted or received over the network 626 via the network interface device 620.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an email or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In accordance with various embodiments, the methods described herein may be implemented as one or more software programs running on a computer processor. Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

It should also be noted that software that implements the disclosed methods may optionally be stored on a tangible storage medium, such as: a magnetic medium, such as a disk or tape; a magneto-optical or optical medium, such as a disk; or a solid state medium, such as a memory card or other package that houses one or more read-only (non-volatile) memories, random access memories, or other re-writable (volatile) memories. The software may also utilize a signal including computer instructions. A digital file attachment to e-mail or other self-contained information archive or set of archives is considered a distribution medium equivalent to a tangible storage medium. Accordingly, the disclosure is considered to include a tangible storage medium or distribution medium as listed herein, and other equivalents and successor media, in which the software implementations herein may be stored.

Although the present specification describes components and functions that may be implemented in particular embodiments with reference to particular standards and protocols, the disclosure is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

Although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A provisioning system comprising:
a services management system including logic to enable a set-top box device that is configured to receive broadband services at a first location to access a broadband service at a second location when the set-top box device is moved from the first location to the second location, the first location associated with a subscriber account and the second location not associated with the subscriber account; and
a subscriber authentication system including logic to evaluate a request that includes subscriber authorization data and to selectively authorize access to the broadband service at the second location based on the subscriber authorization data, wherein the request includes a portability key associated with the set-top box device to facilitate authentication of the request, and wherein the subscriber authentication system enables the set-top box device to access the broadband service when the set-top box device is moved from the first location to the second location after authorizing access to the broadband service at the second location.

2. The provisioning system of claim 1, further comprising an ordering system to receive an order that includes the request to enable the set-top box device to access the broadband service at the second location.

3. The provisioning system of claim 2, wherein access to the ordering system is provided via an interactive voice response system.

4. The provisioning system of claim 2, wherein access to the ordering system is provided via a web portal.

5. The provisioning system of claim 2, wherein the subscriber authentication system enables the set-top box device to access the broadband service at the second location within a predetermined time period after the ordering system receives the request.

6. The provisioning system of claim 1, wherein the subscriber authentication system sends configuration data over a network to the set-top box device to enable the set-top box device to access the broadband service at the second location.

7. The provisioning system of claim 1, further comprising a network inventory system that determines that the broadband service is available to be provided at the second location.

8. The provisioning system of claim 7, wherein the network inventory system determines that a high-speed data service of the broadband service is available at the second location based on a distance of the second location to a network delivery node.

9. The provisioning system of claim 1, further comprising a billing system that charges a fee to the subscriber account, the fee associated with enabling access to the broadband service at the second location.

10. The provisioning system of claim 1, wherein the broadband service includes a voice service, a data service, or a video service.

11. A method comprising:
receiving a request at a provisioning system to enable a set-top box device to function at a temporary location, wherein the request includes a portability key associated with the set-top box device to facilitate authentication of the request;
authenticating the request at the provisioning system;
identifying, at the provisioning system, a broadband service associated with the set-top box device available at the temporary location when the request is authenticated; and
sending a configuration message from the provisioning system to the set-top box device to enable the set-top box device to configure the set-top box device to receive the broadband service at the temporary location.

12. The method of claim 11, further comprising identifying a second broadband service associated with the set-top box device available at the temporary location when the request is authenticated, wherein the configuration message enables the set-top box device to configure the set-top box device to receive the second broadband service at the temporary location.

13. The method of claim 11, further comprising charging an account associated with the set-top box device for enabling the set-top box device to function at the temporary location.

14. The method of claim 11, wherein the configuration message includes an authorization for the set-top box device to access the broadband service at the temporary location.

15. The method of claim 11, wherein the configuration message includes a decoding key to enable the set-top box device to decode data received at the temporary location.

16. The method of claim 11, wherein the request specifies the broadband service and a second broadband service to be used at the temporary location.

17. The method of claim 11, wherein the request is received when the set-top box device is at the temporary location.

18. A computer-readable storage device comprising executable instructions that, when executed by a processor, cause the processor to perform operations comprising:
providing a broadband service to a first output device via a set-top box device at a first location associated with the set-top box device;
sending a request to enable the set-top box device to function at a second location, wherein the request includes a portability key associated with the set-top box device to facilitate authentication of the request; and
receiving a configuration message from a provisioning system, wherein the configuration message enables the set-top box device to provide the broadband service to a second output device at the second location after the set-top box device is relocated to the second location from the first location.

19. The computer-readable storage device of claim 18, wherein the configuration message enables the set-top box to provide broadband services at the second location, and wherein the broadband services are services that the set-top box device is able to provide when the set-top box device is located at the first location.

20. The computer-readable storage device of claim 18, wherein a restriction to the broadband service applicable at the first location is applied to restrict the broadband service at the second location.

* * * * *